D. A. MILLER.
DRIVING AND STEERING MECHANISM FOR VEHICLES.
APPLICATION FILED SEPT. 23, 1909.
965,478.
Patented July 26, 1910.
4 SHEETS—SHEET 1.
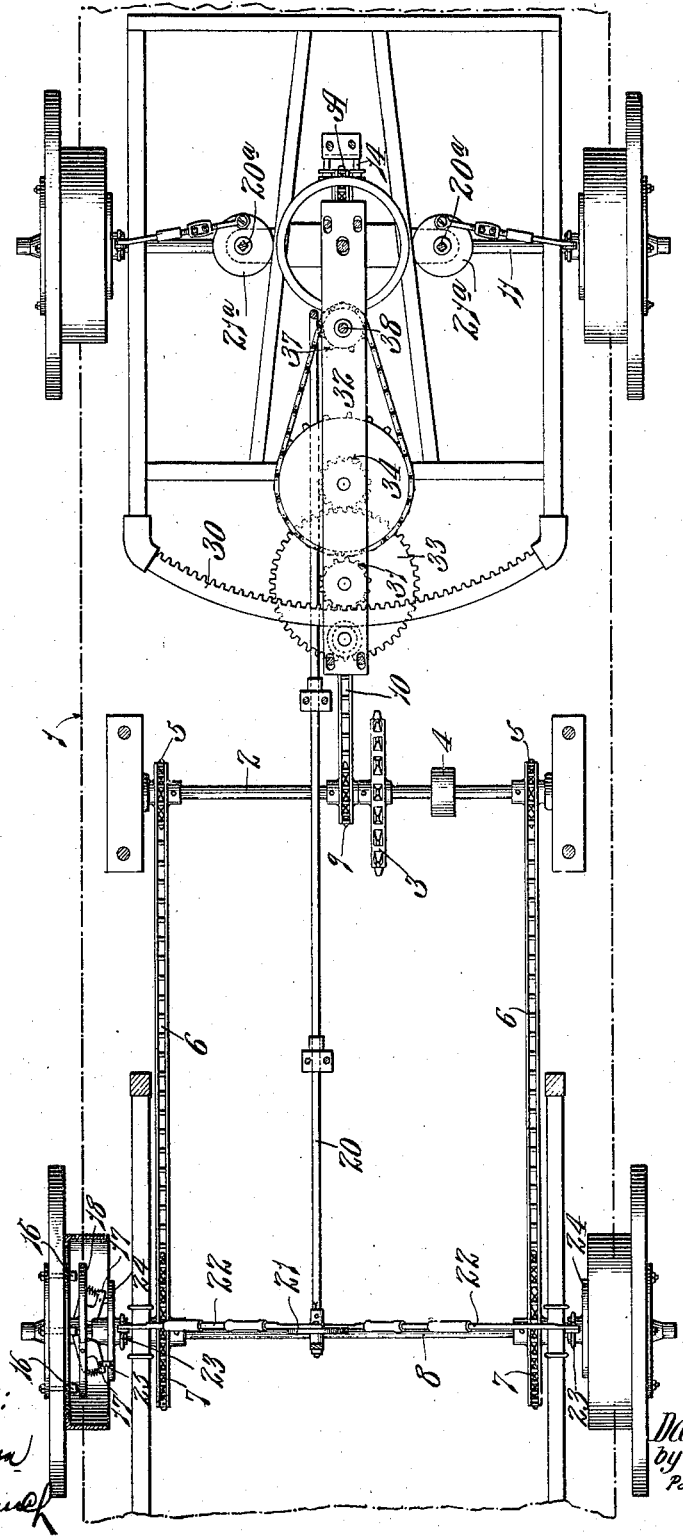
Witnesses:
Geo. Ladson
Nells L Church
Inventor,
Daniel A. Miller
by
Paul Bakewell
Atty.

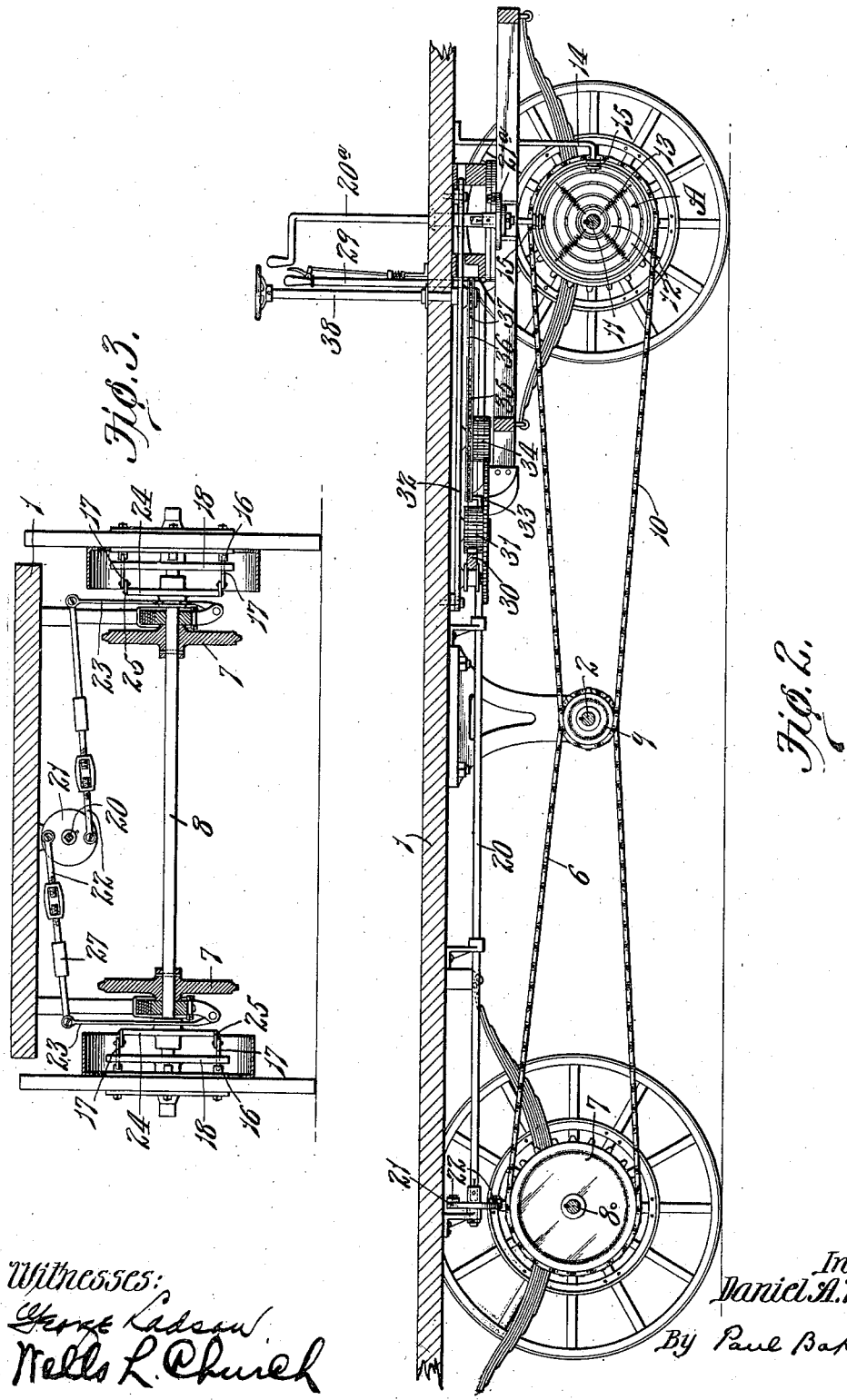

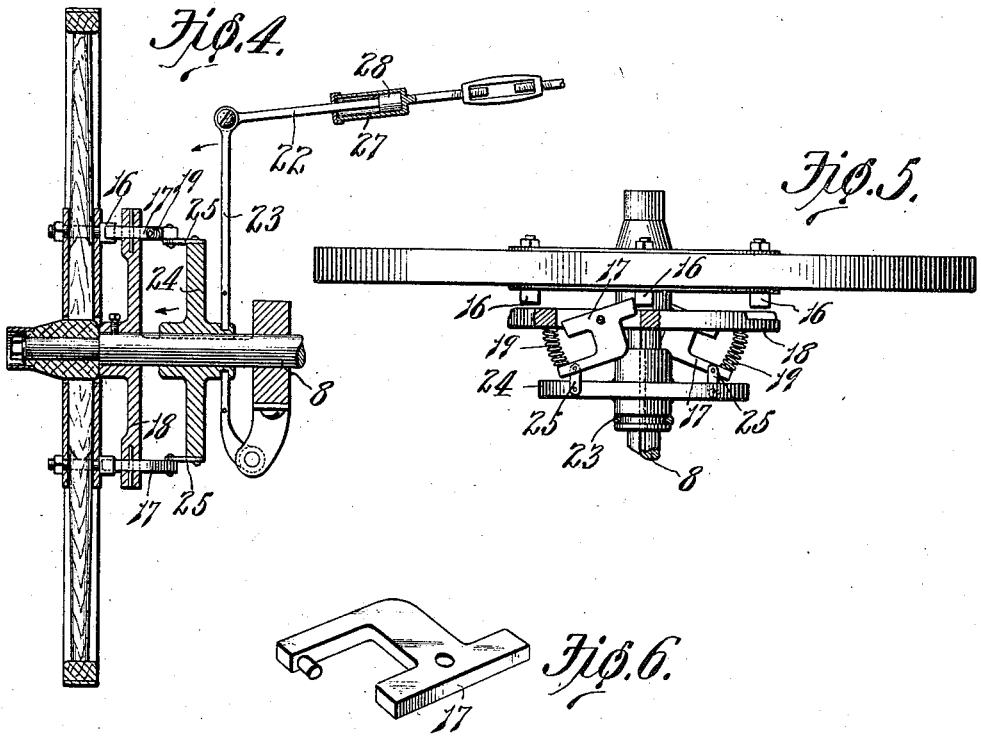

D. A. MILLER.
DRIVING AND STEERING MECHANISM FOR VEHICLES.
APPLICATION FILED SEPT. 23, 1909.
965,478.
Patented July 26, 1910.
4 SHEETS—SHEET 4.
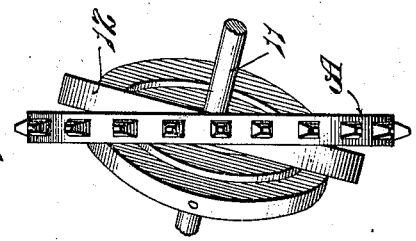
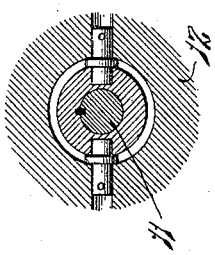
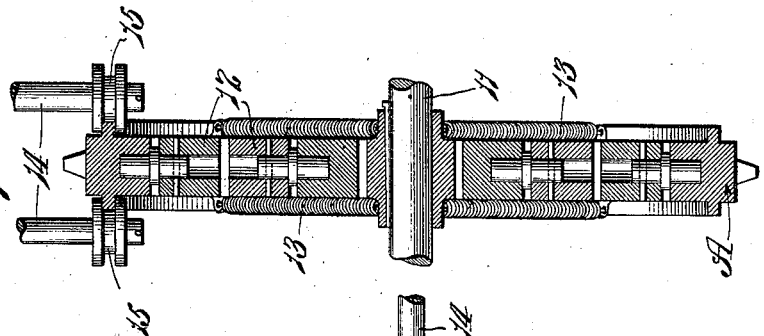
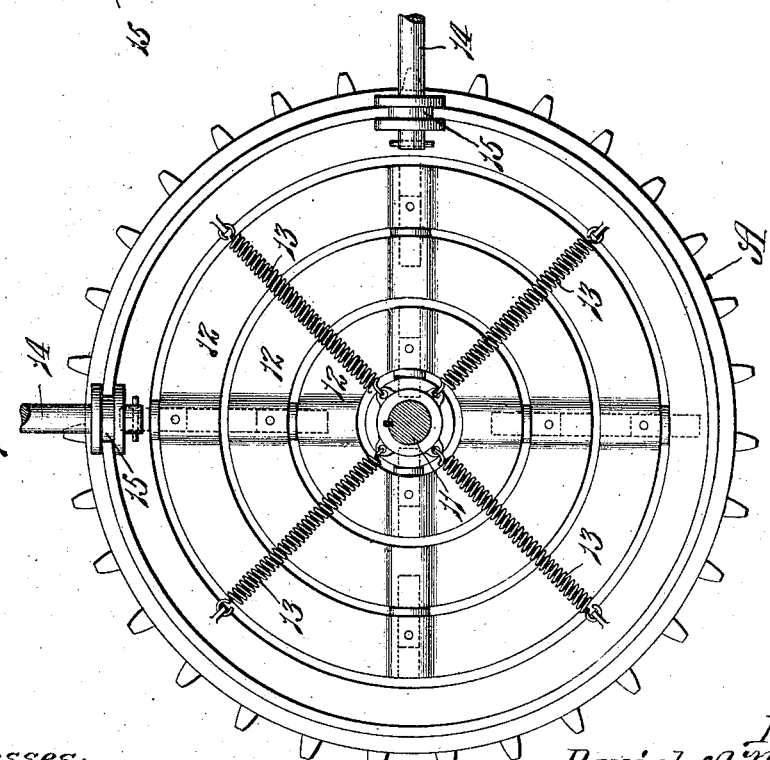
Witnesses:
George Ladson
Wells L. Church
Inventor,
Daniel A. Miller.
By Paul Bakewell
Atty.

UNITED STATES PATENT OFFICE.

DANIEL A. MILLER, OF EAST ST. LOUIS, ILLINOIS.

DRIVING AND STEERING MECHANISM FOR VEHICLES.

965,478.  Specification of Letters Patent.  Patented July 26, 1910.

Application filed September 23, 1909. Serial No. 519,162.

*To all whom it may concern:*

Be it known that I, DANIEL A. MILLER, a citizen of the United States, residing at East St. Louis, Illinois, have invented a certain new and useful Improvement in Driving and Steering Mechanism for Vehicles, of which the following is a full, clear, and exact description, such as will enable others skilled in the art to which it appertains to make and use the same.

This invention relates particularly to driving mechanisms for vehicles.

The main object of my invention is to provide a driving mechanism for vehicles that comprises a driven wheel carried by the front axle of the vehicle and being so constructed that its periphery always remains in the same position irrespective of the position of the front axle.

Another object of my invention is to provide a novel form of clutch mechanism for connecting the wheels of a vehicle to the axles; and still another object of my invention is to provide a novel form of steering mechanism for vehicles.

Figure 1 is a bottom plan view of a vehicle provided with a driving mechanism and a steering mechanism constructed in accordance with my invention; Fig. 2 is a vertical longitudinal sectional view of said vehicle; Fig. 3 is a cross sectional view of said vehicle; Fig. 4 is a detail vertical sectional view of one of the rear wheels and the clutch mechanism that connects said wheel to the rear axle; Fig. 5 is a top plan view of said clutch mechanism; Fig. 6 is a perspective view of one of the dogs that forms part of the clutch mechanism; Fig. 7 is a top plan view of a portion of the bed of the vehicle showing the steering wheel and the devices for operating the clutches that connect the wheels to the axles; Fig. 8 is an enlarged side elevational view of the driven sprocket wheel on the front axle; Fig. 9 is a vertical cross sectional view of said sprocket wheel; Fig. 10 is a diagrammatic view illustrating the position the different rings of the driven sprocket wheel on the front axle assume; and Fig. 11 is a detail sectional view showing the way in which the rings of the sprocket wheel on the front axle are connected together.

Referring to the drawings, 1 designates the bed or body of the vehicle, and 2 designates a shaft journaled in bearings on the underneath side of said bed, said shaft being provided with a sprocket wheel 3 that is driven by a chain, not shown, such, for example, as a chain connected to the drive shaft of an engine. This shaft 2 is provided with a pulley 4 that is adapted to be engaged by a band brake, not shown, and two sprocket wheels 5 are connected to said shaft for driving chains 6 that pass over sprocket wheels 7 on the rear axle 8 of the vehicle. The shaft 2 is also provided with a sprocket wheel 9 that drives a chain 10, which passes over a sprocket wheel A keyed to the front axle 11 of the vehicle. This sprocket wheel A is arranged in a vertical plane and is so constructed that its toothed portion or periphery always remains in the same position, irrespective of the position of the front axle; that is to say, the front axle can twist or turn so as to guide the vehicle without affecting the position of the periphery of the sprocket wheel A which is engaged by the sprocket chain 10.

As shown clearly in Fig. 8, the sprocket wheel A consists of a number of rings 12 of different diameters arranged inside of each other and pivotally connected together in such a manner that they can move relatively to each other and thus permit the front axle to be turned to guide the vehicle without affecting the position of the outer ring, which carries teeth that mesh with the sprocket chain 10. A number of springs 13 are connected to the outer ring 12 and to the inner ring which is connected to the front axle, so as to return all of said rings to their normal positions when the front axle lies parallel with the rear axle.

The bed of the vehicle is provided with a plurality of depending arms 14 which carry grooved rollers 15 that embrace the outer ring of the sprocket wheel A and thus hold said outer ring in a perfectly vertical position.

The rear wheels are loosely mounted on the rear axle 8, and each of said wheels is provided on its inner side with a number of projections 16, as shown in Fig. 5, that are adapted to be engaged by a pair of dogs 17 pivotally connected to a disk 18 secured to the rear axle, and thus cause said rear wheels to rotate with the rear axle, which is positively driven by the chains 6. The dogs 17 are acted upon by coiled expansion springs 19 which hold them in engagement with the projections 16, and said dogs are adapted to be moved out of engagement with said projections so as to disconnect the rear wheels from the rear axle by means under control of the operator standing on the bed of the vehicle. The means herein shown for disengaging the dogs of both of the rear wheels consists of a shaft 20 mounted in bearings on the underneath side of the vehicle and provided at its rear end with a disk 21, as shown in Fig. 2, to which links 22 are connected, the inner ends of said links being connected to said disk at diametrically opposite points. The outer end of each of the links 22 is connected to the upper end of an arm 23 having a yoke that enters a groove in the hub of a disk 24, which is slidingly mounted on the rear axle, said disk 24 being connected by means of links 25 to the dogs 17, as shown in Figs. 4 and 5.

As previously stated, the expansion springs 19 normally hold the dogs 17 in engagement with the projections 16 on the rear wheels, and when it is desired to disconnect said rear wheels from the rear axle the shaft 20 is rotated so as to cause the links 22 to move the upper ends of the arms 23 outwardly, and thus move the disks 24 longitudinally of the rear axle in the direction indicated by the arrow in Fig. 4, thereby moving the dogs 17 out of engagement with the projections 16. With a construction of this character, when the vehicle is turning, the outside rear wheel can travel at a greater rate of speed than the inside wheel in view of the fact that the projections 16 on the outside wheel snap past the ends of the dogs 17 and thus cause them to be moved inwardly against the stress of the springs 19. To provide for this inward movement of the free ends of the dogs 17 I have constructed the links 22 in sections, as shown in Fig. 4, each of said links comprising two separate parts. One part of the link is provided with a housing or cylinder 27, and the other part of the link is provided with a head 28 arranged inside of said housing and normally contacting with the inner end thereof. When the projections 16 on the outside wheel engage the free end of the dogs 17 and force them inwardly the links 25, which connect said dogs to the disk 24, will cause said disk to move longitudinally of the rear axle toward the outer end thereof, and thus shift the arm 23 of the clutch for the outside wheel, the section of the link 22 which is connected to the upper end of said arm moving outwardly without affecting the position of the other part of said link.

In case the expansion springs 19 which act on the dogs 17 should become broken the operator can turn the shaft 20 far enough to bring the outer ends of the housings 27 in engagement with the heads 28 on one part of each of the links 22, and thus pull the upper ends of the levers 23 inwardly, thereby moving the disks 24 in such a direction that the free ends of the dogs 17 will be forced outwardly or into engagement with the projections 16 on the inside face of the wheels.

The wheels of the front axle are provided with a similar clutch mechanism, but instead of connecting said clutch mechanisms together I prefer to employ means for actuating the clutch of each wheel independently. As shown in Fig. 1, a disk $21^a$ is provided for each wheel and each of said disks is connected to a shaft $20^a$ that projects upwardly through a slot in the bed of the vehicle and is provided at its upper end with a handle or crank arm. The shaft 20 that controls the clutches of the rear wheels is also provided with a handle 29 that projects upwardly through a slot in the bed 1 of the vehicle, as shown in Fig. 2.

The front truck of the vehicle is provided with a rack bar 30, as shown in Fig. 1, that meshes with a pinion 31 connected to a shaft that is journaled in a bearing-plate 32 on the underneath side of the bed 1 of the vehicle, said shaft being provided with a gear 33 that meshes with a pinion 34 connected to another shaft that is journaled in the plate 32. Said shaft has a sprocket wheel 35 connected thereto, and this sprocket wheel is surrounded by a chain 36 that also surrounds a sprocket wheel 37 on the lower end of the steering shaft 38, which projects upwardly through the bed of the vehicle. By turning the shaft 38 a rotary movement is imparted to the pinion 31, thereby causing the front truck of the vehicle to turn.

While I have herein shown my improved driving wheel applied to the front axle of a vehicle, I do not wish it to be understood that my broad idea is limited to such a construction for a wheel of the character herein described could be used for various other purposes without departing from the spirit of my invention.

Having thus described my invention, what I claim as new and desire to secure by Letters Patent is:

1. In a driving mechanism, a driving wheel comprising a central section connected to a driven member, an outer section that coöperates with a driving member, a plurality of intermediate sections arranged between said outer section and central section, pivotal connections between said sections, and a yielding connection between said outer section and central section that tends to hold said sections in alinement with each other.

2. A vehicle provided with a front axle, a wheel carried by said axle and consisting of a plurality of ring-shaped sections arranged one within the other and pivotally connected together, the central section being secured to the axle, springs connected to the central section and to the outer section of the wheel which tends to hold said sections in alinement with each other, and a driving member coöperating with the outer section of the wheel.

3. A vehicle provided with a front axle, a sprocket wheel carried by said axle and consisting of a number of ring-shaped sections arranged one within the other and pivotally connected together, the central section being secured to said axle, coiled contractile springs arranged on opposite sides of said sections and connected to the central section and to the outer section for moving the central section into alinement with the outer section, and a driving chain coöperating with teeth on the outer section of the wheel.

4. A vehicle provided with a front axle, a sprocket wheel carried by said axle and consisting of a plurality of ring-shaped sections arranged one inside of the other and pivotally connected together, the central section being secured to the axle, means carried by the body of the vehicle and coöperating with the outer section of said wheel for preventing it from turning when the axle assumes an angular position, and a yielding connection between the central section and the outer section of said wheel that tends to hold said sections in alinement with each other.

In testimony whereof I hereunto affix my signature in the presence of two witnesses, this 20th day of September 1909.

DANIEL A. MILLER.

Witnesses:
   THOS. F. MAHER,
   AL. HANNON.